US011560967B2

(12) United States Patent
Turnau, III et al.

(10) Patent No.: US 11,560,967 B2
(45) Date of Patent: Jan. 24, 2023

(54) ROTATION-RESISTANT PUSH-ON CONDUIT COUPLING CARTRIDGE

(71) Applicant: BrassCraft Manufacturing Company, Novi, MI (US)

(72) Inventors: William F. Turnau, III, Canton, MI (US); Joseph P. Schutte, Ann Arbor, MI (US)

(73) Assignee: Brasscraft Manufacturing Company, Novi, MI (US)

( * ) Notice: Subject to any disclaimer, the term of this patent is extended or adjusted under 35 U.S.C. 154(b) by 221 days.

(21) Appl. No.: 16/551,019

(22) Filed: Aug. 26, 2019

(65) Prior Publication Data

US 2020/0072381 A1  Mar. 5, 2020

Related U.S. Application Data

(60) Provisional application No. 62/726,551, filed on Sep. 4, 2018.

(51) Int. Cl.
*F16K 31/60* (2006.01)
*F16L 55/07* (2006.01)
*F16K 5/04* (2006.01)
*F16K 5/02* (2006.01)

(52) U.S. Cl.
CPC .......... *F16K 31/607* (2013.01); *F16K 5/0292* (2013.01); *F16K 5/045* (2013.01); *F16L 55/07* (2013.01)

(58) Field of Classification Search
CPC ...... F16K 31/607; F16K 31/602; F16K 5/045; F16K 5/0292; F16K 5/04; F16L 55/07; F16L 33/006; F16L 33/22; F16L 21/02; F16L 37/091
See application file for complete search history.

(56) References Cited

U.S. PATENT DOCUMENTS

| 1,440,207 A | 12/1922 | Burns |
| 2,479,960 A | 8/1949 | Osborn |
| 3,131,905 A | 5/1964 | Nyberg |
| 3,334,661 A | 8/1967 | Milette |
| 3,429,596 A | 2/1969 | Marshall |
| 3,776,260 A | 12/1973 | Ruddick |
| 4,049,014 A | 9/1977 | Johnson et al. |

(Continued)

FOREIGN PATENT DOCUMENTS

| CN | 103104770 | 5/2013 |
| EP | 0528079 | 2/1993 |

(Continued)

*Primary Examiner* — Craig J Price
*Assistant Examiner* — Andrew J Rost
(74) *Attorney, Agent, or Firm* — Bose McKinney & Evans LLP

(57) ABSTRACT

The present disclosure relates to a rotary plug valve and, more particularly, to a rotary plug valve having a fluid conduit cartridge including components that are assembled in a manner allowing for the rotation of a valve handle without rotation of the entire valve or supply line. Illustratively, a retainer ring and a backer ring are coupled with a gripper ring positioned therebetween. Coupling of the retainer ring and the backer ring creates compression on locking tabs of the grip ring, holding the locking tabs in place between tangs of the backer ring and preventing rotation of the gripper ring.

24 Claims, 6 Drawing Sheets

(56) References Cited

U.S. PATENT DOCUMENTS

| | | | |
|---|---|---|---|
| 4,336,824 A | 6/1982 | Steineman | |
| 4,613,112 A | 9/1986 | Philpot et al. | |
| 4,632,437 A | 12/1986 | Robson et al. | |
| 4,717,048 A | 1/1988 | Stenger | |
| 4,749,214 A | 6/1988 | Hoskins et al. | |
| 5,029,908 A | 7/1991 | Belisaire | |
| 5,090,599 A | 2/1992 | Stenger | |
| 5,160,179 A | 11/1992 | Takagi | |
| 5,230,539 A * | 7/1993 | Olson | F16L 37/0927 285/323 |
| 5,348,354 A * | 9/1994 | Badoureaux | B25B 27/10 285/308 |
| 5,405,175 A | 4/1995 | Bonnah et al. | |
| 5,487,572 A | 1/1996 | Combot-Courrau et al. | |
| 5,607,190 A | 3/1997 | Exandier et al. | |
| 5,803,513 A | 9/1998 | Richardson | |
| 5,971,019 A | 10/1999 | Imai | |
| RE36,630 E | 3/2000 | Davey | |
| 6,142,538 A | 11/2000 | Volgstadt | |
| 6,173,999 B1 | 1/2001 | Gues | |
| 6,293,596 B1 | 9/2001 | Kinder | |
| 6,328,344 B1 | 12/2001 | Tozaki et al. | |
| 6,447,019 B1 * | 9/2002 | Hosono | F16L 41/007 285/148.19 |
| 6,450,550 B1 | 9/2002 | Cornwell | |
| 6,464,266 B1 | 10/2002 | O'Neill et al. | |
| 6,499,771 B1 | 12/2002 | Snyder et al. | |
| 6,578,879 B2 * | 6/2003 | Muto | F16L 13/143 285/322 |
| 6,637,779 B2 | 10/2003 | Andre | |
| 6,702,335 B2 | 3/2004 | Bahner et al. | |
| 6,860,523 B2 | 3/2005 | O'Neill et al. | |
| 6,893,051 B1 | 5/2005 | Park et al. | |
| 6,905,143 B2 | 6/2005 | Klinger et al. | |
| 6,913,292 B2 | 7/2005 | Snyder, Sr. et al. | |
| 7,014,220 B2 | 3/2006 | Szabo et al. | |
| 7,029,036 B2 | 4/2006 | Andre | |
| 7,063,359 B2 * | 6/2006 | Vallee | F16L 37/0915 285/308 |
| 7,121,592 B2 | 10/2006 | Sazbo et al. | |
| 7,128,347 B2 | 10/2006 | Kerin | |
| 7,232,159 B2 | 6/2007 | O'Neill et al. | |
| 7,300,076 B2 | 11/2007 | Inoue | |
| 7,314,209 B2 | 1/2008 | Pierson | |
| 7,338,030 B2 | 3/2008 | Brown, III | |
| 7,390,025 B2 | 6/2008 | Pepe et al. | |
| 7,396,053 B2 | 7/2008 | Webb et al. | |
| 7,419,190 B1 | 9/2008 | Atkinson et al. | |
| 7,434,846 B2 | 10/2008 | Baumgartner | |
| 7,445,249 B2 | 11/2008 | Feger et al. | |
| 7,455,330 B2 | 11/2008 | Baumgartner | |
| 7,464,970 B2 | 12/2008 | Yamada et al. | |
| 7,469,880 B2 | 12/2008 | Green et al. | |
| 7,469,936 B2 | 12/2008 | Norman | |
| 7,497,480 B2 | 3/2009 | Kerin et al. | |
| 7,523,966 B2 | 4/2009 | O'Neill et al. | |
| 7,527,303 B2 | 5/2009 | Furuya | |
| 7,530,605 B2 | 5/2009 | Rigollet et al. | |
| 7,530,606 B1 | 5/2009 | Yang | |
| 7,644,958 B2 | 1/2010 | Postler | |
| 7,651,138 B2 | 1/2010 | Feger et al. | |
| 7,686,349 B2 | 3/2010 | Guest | |
| 7,726,700 B2 | 6/2010 | Norman | |
| 7,810,850 B2 | 10/2010 | O'Neill et al. | |
| 7,823,930 B2 | 11/2010 | Feger et al. | |
| 7,841,630 B1 | 11/2010 | Auray et al. | |
| 8,844,981 B1 | 9/2014 | Crompton et al. | |
| 9,086,179 B1 | 7/2015 | Komolrochanaporn | |
| 9,228,681 B2 * | 1/2016 | Kluss | F16L 37/091 |
| 9,447,906 B2 | 9/2016 | Bobo et al. | |
| 9,464,743 B2 | 10/2016 | Schutte et al. | |
| 9,494,268 B2 | 11/2016 | Schutte et al. | |
| 9,506,592 B2 | 11/2016 | Turnau, III et al. | |
| 9,523,454 B2 | 12/2016 | Schutte et al. | |
| 9,777,875 B2 | 10/2017 | Bobo et al. | |
| 2003/0217571 A1 | 11/2003 | Turnau, III et al. | |
| 2004/0021120 A1 | 2/2004 | Turnau, III et al. | |
| 2004/0245766 A1 * | 12/2004 | Vallee | F16L 37/0915 285/39 |
| 2006/0208213 A1 | 9/2006 | Turnau et al. | |
| 2007/0075542 A1 | 4/2007 | Glaze et al. | |
| 2007/0241562 A1 | 10/2007 | O'Neill | |
| 2008/0061550 A1 | 3/2008 | Brosius et al. | |
| 2008/0149873 A1 | 6/2008 | Cimberio et al. | |
| 2008/0238088 A1 | 10/2008 | Webb | |
| 2008/0238096 A1 | 10/2008 | Kees et al. | |
| 2008/0279621 A1 | 11/2008 | Chaupin | |
| 2008/0309081 A1 | 12/2008 | De Wilde | |
| 2009/0001712 A1 | 1/2009 | Webb et al. | |
| 2009/0194990 A1 | 8/2009 | Williams | |
| 2009/0278346 A1 | 11/2009 | O'Brien | |
| 2010/0072744 A1 | 3/2010 | Xie | |
| 2010/0171308 A1 * | 7/2010 | Sanzone | F16L 37/0915 285/379 |
| 2010/0253064 A1 * | 10/2010 | Le Quere | F16B 43/006 285/3 |
| 2011/0088790 A1 | 4/2011 | Schutte et al. | |
| 2011/0089681 A1 | 4/2011 | Schutte et al. | |
| 2011/0089684 A1 | 4/2011 | Schutte et al. | |
| 2011/0163539 A1 | 7/2011 | Naor | |
| 2013/0181446 A1 | 7/2013 | Le Clinche | |
| 2013/0200609 A1 | 8/2013 | Dole et al. | |
| 2015/0021911 A1 | 1/2015 | Bowman et al. | |
| 2015/0240980 A1 | 8/2015 | Bobo et al. | |
| 2015/0323112 A1 * | 11/2015 | Wright | F16L 21/08 285/349 |
| 2015/0345683 A1 | 12/2015 | Crompton et al. | |
| 2016/0273695 A1 | 9/2016 | Bobo et al. | |
| 2019/0219207 A1 * | 7/2019 | Phillips | B29C 65/0672 |

FOREIGN PATENT DOCUMENTS

| | | |
|---|---|---|
| EP | 0745801 | 12/1996 |
| GB | 2466681 | 7/2010 |
| WO | WO 03/089827 | 10/2003 |
| WO | WO 2005/106311 | 11/2005 |
| WO | WO 2013185026 | 12/2013 |
| WO | WO 2016162674 | 10/2016 |
| WO | WO 2017/204818 | 11/2017 |
| WO | WO 2018/023196 | 2/2018 |

* cited by examiner

ROTATION-RESISTANT PUSH-ON CONDUIT COUPLING CARTRIDGE

CROSS-REFERENCE TO RELATED APPLICATION

This application claims priority to U.S. Provisional Patent Application Ser. No. 62/726,551 filed on Sep. 4, 2018, the disclosure of which is hereby incorporated by reference in its entirety.

BACKGROUND AND SUMMARY

This disclosure relates generally to plumbing components and assemblies and, more particularly, to rotary plug valves and to push-on quick-connect couplings between axially overlapping plumbing components that are automatically lockable by a toothed ring.

A conventional rotary plug valve, such as an angle supply stop, typically includes a housing having an inlet at one end of the housing, a valve handle at an opposite end of the housing, an internal valve member connected to the handle, and an outlet of the housing between the housing ends and in selective fluid communication with the inlet via the valve member. The supply stop may include a conventional quick-connect coupling, and wherein the housing may carry a toothed ring having radially inwardly projecting teeth, wherein the supply line may be inserted into the housing in an insertion direction so as to deflect the teeth, which bite the supply line to resist removal from the housing.

But when a user rotates the valve handle of a conventional supply stop during operation, the supply stop tends to rotate on a supply line to which the supply stop is connected. In particular, when the supply stop is coupled to a flexible supply line, the supply stop tends to rotate more freely than if the supply stop was coupled to a rigid supply line. Such rotation of the supply stop requires a user to grasp the valve housing or the supply line with one hand while rotating the handle with another hand. Some prior solutions to this problem may require use of costly threading or special fasteners, excessive component quantities, and/or complex component configurations.

The present disclosure relates to a rotary plug valve and, more particularly, to a rotary plug valve having a fluid conduit cartridge including components that are assembled in a manner allowing for the rotation of a valve handle without rotation of the entire valve or supply line. For example, a retainer ring and a backer ring are illustratively coupled with a gripper ring positioned therebetween, wherein the coupling of the retainer ring and the backer ring creates compression on locking tabs of the grip ring, holding the locking tabs in place between tangs of the backer ring and preventing rotation of the gripper ring.

According to an illustrative embodiment of the present disclosure, a valve assembly includes a valve body defining a supply passage, the supply passage having an interior wall, and a coupling cartridge positioned at least partially within the supply passage of the valve body. The coupling cartridge includes a retainer ring having an outer wall, wherein the outer wall of the retention ring directly contacts the internal wall of the supply passage, a gripper ring defining an opening, the gripper ring including a base wall and a plurality of internal tabs extending from the base wall into the opening of the gripper ring, and a backer ring coupled to the retainer ring, wherein the gripper ring is positioned between the retainer ring and the backer ring.

In such a valve assembly, the retainer ring may comprise a first coupler and a second coupler, the first coupler defining the outer wall of the retainer ring. The first coupler may comprise metal. The second coupler may comprise polymer. The first coupler and the second coupler may be coupled together by overmolding.

The valve body of the valve assembly may comprise an internal shoulder and a crimped inlet end, wherein the coupling cartridge is axially positioned between the internal shoulder and the crimped inlet end. A seal may be disposed between the backer ring and the internal shoulder of the valve body.

The backer ring of the valve assembly may comprise a circumferential array of external projections. The valve assembly may further comprise a center support carried radially inwardly of the coupling cartridge. The retainer ring may comprise at least one groove on the outer wall and the backer ring may comprise at least one tang configured to snap-fit with the at least one notch of the retainer ring.

In another illustrative embodiment of the present disclosure, a fluid conduit coupling cartridge includes a retainer ring having an outer wall and including a plurality of grooves, and a notch wall defined between adjacent ones of the grooves. A gripper ring defines an opening, the gripper ring including a base wall, a plurality of internal tabs extending from the base wall into the opening of the gripper ring, and at least one lock tab extending outwardly from the base wall. The fluid conduit coupling cartridge further comprises a backer ring having a base wall and a plurality of tangs extending away from the base wall, and a resist notch defined between adjacent ones of the tangs. The plurality of tangs of the backer ring are configured to couple to the plurality of grooves of the retainer ring. The gripper ring is positioned between the retainer ring and the backer ring so that the at least one lock tab is positioned between the notch wall and the resist notch.

The retainer ring of the fluid conduit coupling cartridge may include a metal coupler and a plastic coupler overmolded to the metal coupler. The notch wall, the resist notch, and the lock tab may be substantially the same width.

In yet another illustrative embodiment of the present disclosure, a valve assembly includes a valve body including a supply passage; and a coupling cartridge at least partially carried in the supply passage of the valve body, and including: a retainer ring including a maximum diameter that is interference fit to the supply passage of the valve body. The coupling cartridge includes a gripper ring including a base wall, gripping teeth, and one or more locking tabs extending radially outwardly from the base wall, and a backer ring that is interference fit to the retainer ring to trap the gripper ring between the retainer ring and the backer ring.

The backer ring of the assembly may include a base wall and one or more tangs extending away from the base wall for coupling to the retainer ring and establishing locking notches for anti-rotational registration of the locking tabs of the gripper ring. The retainer ring may include a metal coupler establishing the maximum outer diameter of the retainer ring that is interference fit to the supply passage of the valve body. The retainer ring may also include a plastic coupler overmolded to the metal coupler and having an interlocking end for snap-fit cooperation with the backer ring. The tangs of the backer ring may be for snap-fit cooperation with the interlocking end of the plastic coupler.

The retainer ring may be an overmolded two-piece component. The valve body may include and internal shoulder and a crimped inlet end, wherein the coupling cartridge is axially trapped between the internal shoulder and the crimped inlet end. The backer ring may include a circumferential array of external projections. The assembly may further comprise a seal disposed between the backer ring and an internal shoulder of the valve body. The assembly may further comprise a center support carried radially inwardly of the coupling cartridge.

In yet another embodiment of the present disclosure, a fluid conduit coupling cartridge includes a retainer ring, a gripper ring including a base wall, gripping teeth, and one or more locking tabs extending radially outwardly from the base wall, and a backer ring that is interference fit to the retainer ring to trap the gripper ring between the retainer ring and the backer ring. The backer ring includes a base wall, and one or more tangs extending away from the base wall for coupling to the retainer ring and establishing locking notches for anti-rotational registration of the locking tabs of the gripper ring.

The retainer ring may be an overmolded two-piece component. The retainer ring may include a metal coupler and a plastic coupler overmolded to the metal coupler. The retainer ring may include an interlocking end for snap-fit cooperation with the backer ring. The tangs of the backer ring may be for snap-fit cooperation with the interlocking end of the plastic coupler.

BRIEF DESCRIPTION OF THE DRAWINGS

The detailed description of the drawings particularly refers to the accompanying figures in which.

DETAILED DESCRIPTION

The embodiments of the disclosure described herein are not intended to be exhaustive or to limit the disclosure to the precise forms disclosed. Rather, the embodiments described herein enable one skilled in the art to practice the disclosure.

In general, plumbing assemblies, sub-assemblies, and components will be described using one or more examples of illustrative embodiments of a fluid supply stop that includes a housing with an inlet and an outlet, a rotatable valve between the inlet and the outlet, and a handle connected to the valve. As will be described in greater detail below, the presently disclosed subject matter includes an improved arrangement of improved coupling components and/or materials for improved performance of a plumbing connection. For example, the presently disclosed subject matter may be used to secure the supply stop to a supply line, yet resist rotation of the supply stop while a user operates the handle, but still allow an installer to rotate the supply stop to properly orient the outlet toward a desired flow direction. Also, the presently disclosed subject matter may use a minimal quantity of components, and reduce the need for threads or special fasteners. The example embodiments will be described with reference to use with a supply stop of right-angled, cylindrical construction, and with reference to use in household plumbing applications. However, it will be appreciated as the description proceeds that the invention defined by the claims is useful in many different applications and may be implemented in many other embodiments including use of other types of valves, uses not involving valves, and in commercial and industrial applications.

Figure 1:
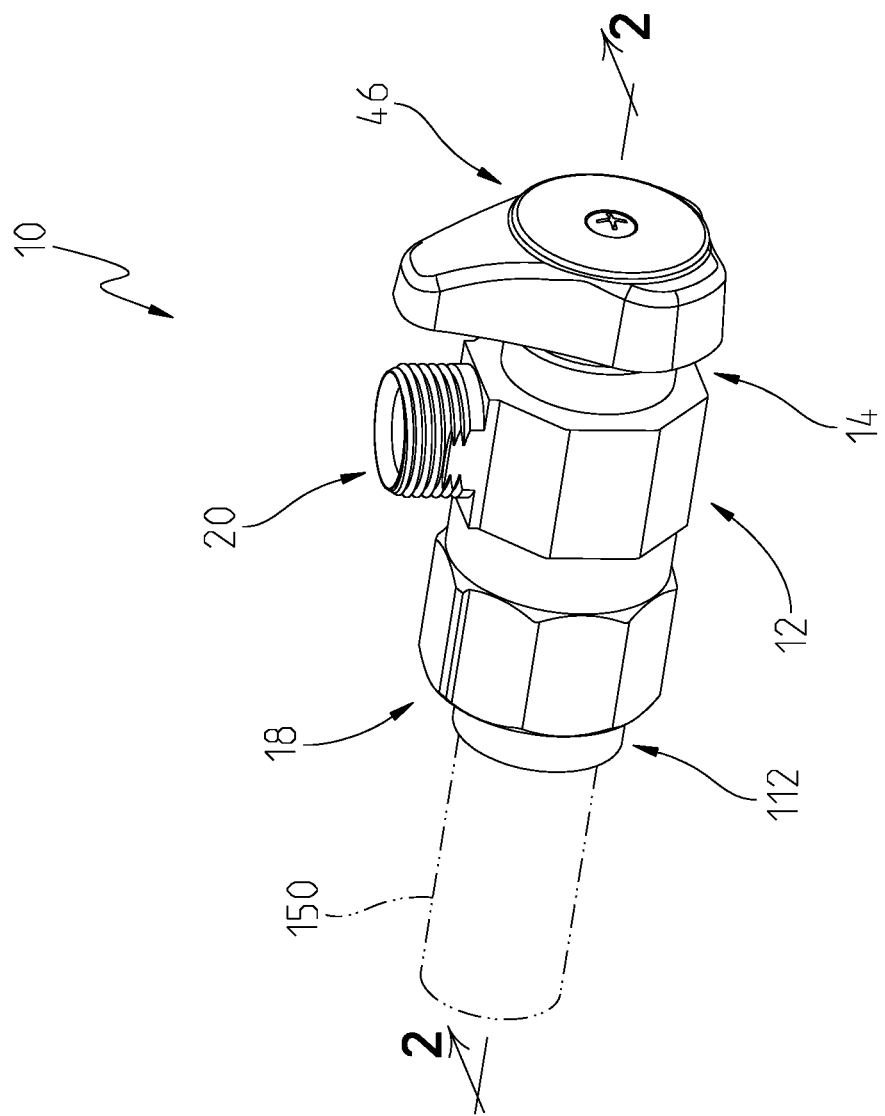
FIG. 1 is a perspective view of an illustrative embodiment of a valve assembly, the valve assembly including an illustrative embodiment of a conduit coupling cartridge.

Referring generally to FIGS. 1-5 and, more specifically, to FIG. 1, there is shown an illustrative embodiment of a valve assembly 10 including a valve body 12, a valve 14 carried by the valve body 12, and a valve handle 46 coupled to the valve body to facilitate operation, e.g. rotation, of the valve 14. The valve body 12 includes an inlet 18 and an outlet 20, wherein the inlet 18 is in selective communication with the outlet 20. A supply line, e.g. a pipe or other fluid conduit 150, may be coupled to the valve assembly 10 via a rotation resistant push-on conduit coupling 16 so that the supply line 150 is in communication with the inlet 18, and thereby in selective communication with the outlet 20.

The example assembly 10 illustrated in FIG. 1 is of right-angled, cylindrical, plug valve construction wherein fluid flows in both an axial and radial direction through the valve 14, but those of ordinary skill in the art would recognize that any other orientations and shapes of the valve assembly 10 are contemplated by the scope of the present disclosure and claims. In other embodiments, the valve assembly 10 may be of any other type or construction suitable for use in fluid control, including those having a ball, seat, and spindle, or having a threaded member and threaded spindle advanceable along an axis. In any case, the valve body 12 may be composed of metal, for instance, brass, or a polymer, such as plastic, for instance, polyoxymethylene, and various sealing components may be composed of PTFE.

Figure 2:
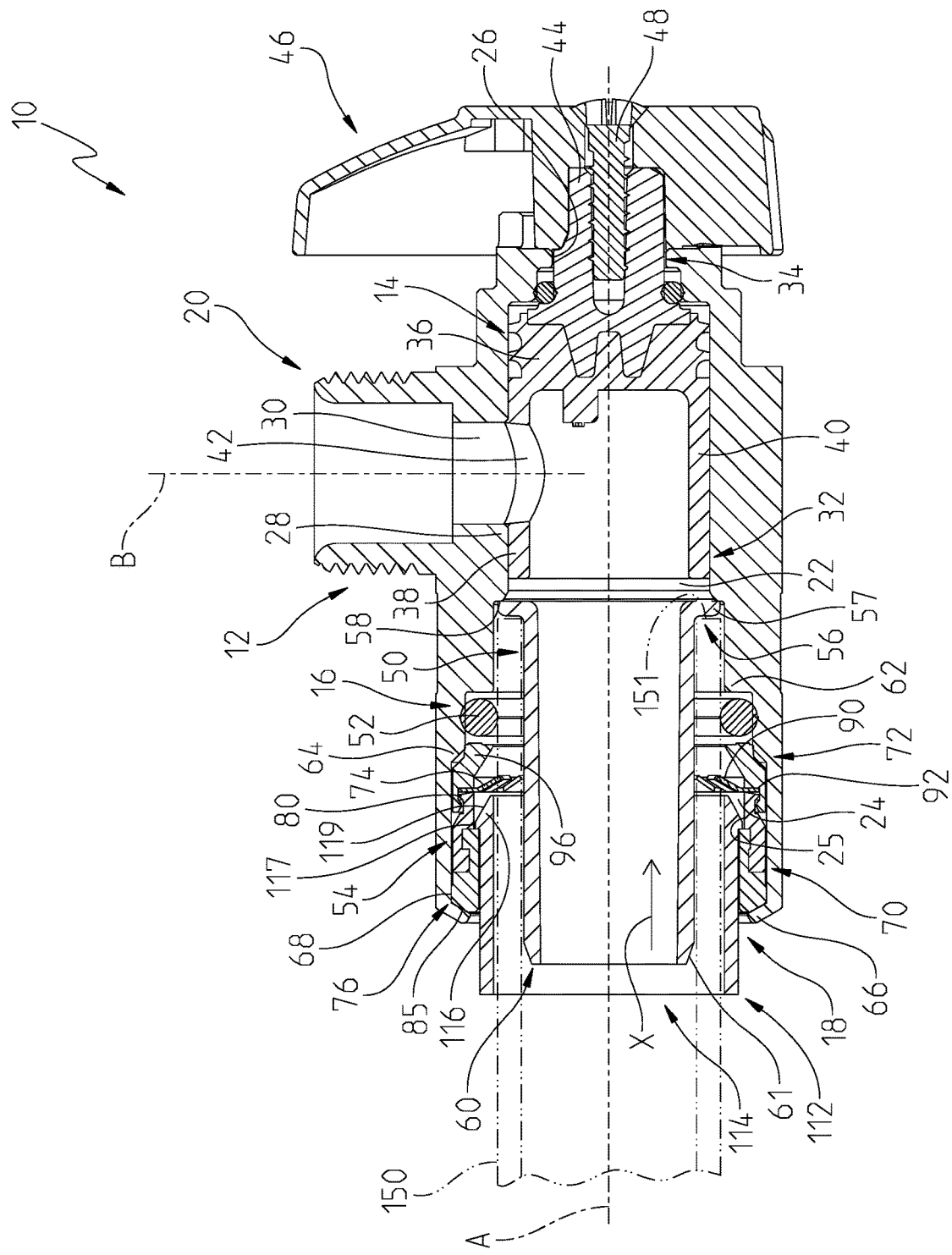
FIG. 2 is a cross-sectional view of the illustrative valve assembly of FIG. 1, taken along line 2-2 of FIG. 1.

Now referring to FIG. 2, a cross-section of the valve assembly 10 as portrayed in FIG. 1 is shown along line 2-2 of FIG. 1. As shown, the valve body 12 includes a valve channel 22 and a supply passage 24 extending from the inlet 18 to the outlet 20. The supply passage 24 includes an interior wall 25 having an internal diameter. The valve body 12 further includes a valve port 26 at an opposite end of the inlet 18. In the illustrated example, the valve body 12 has a longitudinal axis A extending between the inlet 18 and the valve port 26, and the outlet 20 is transversely disposed with respect to the inlet 18 and the valve port 26 along axis B. As used herein, the terminology "transversely disposed" may include perpendicularly disposed, as exemplified in FIG. 1, or acutely, obtusely, or otherwise obliquely disposed at any suitable angle with respect to the axis A. The valve body 12 includes any suitable walls, bosses, and/or other housing structure to carry the valve 14 therein. In particular, the valve body 12 may include a valve seal wall 28 having an outlet aperture 30 extending therethrough in communication with the valve body outlet 20 and being overlapped by a portion of the valve 14.

The valve 14 is rotatable about the axis A, and may include an internal valve member or plug 32 and a spindle 34 coupled to the plug 32. The plug 32 has a coupling end 36, an open inlet end 38, and a sidewall 40 extending between the open inlet end 38 and the coupling end 36 and having an outlet aperture 42 in selective registration with the outlet aperture 30. The spindle 34 may be coupled to the coupling end 36 of the plug 32 by molding, adhesion, or in any other suitable manner. The spindle 34 includes a stem 44 extending through the valve port 26 that may be splined, keyed, flatted, or otherwise provided with a means for positive circumferential coupling to a valve handle 46 to facilitate manipulation of the plug 32, such as rotation of the plug 32 within the valve body 12, and that may be fastened to the handle 46 via a fastener 48 or coupled thereto in any other suitable manner.

Figure 3:
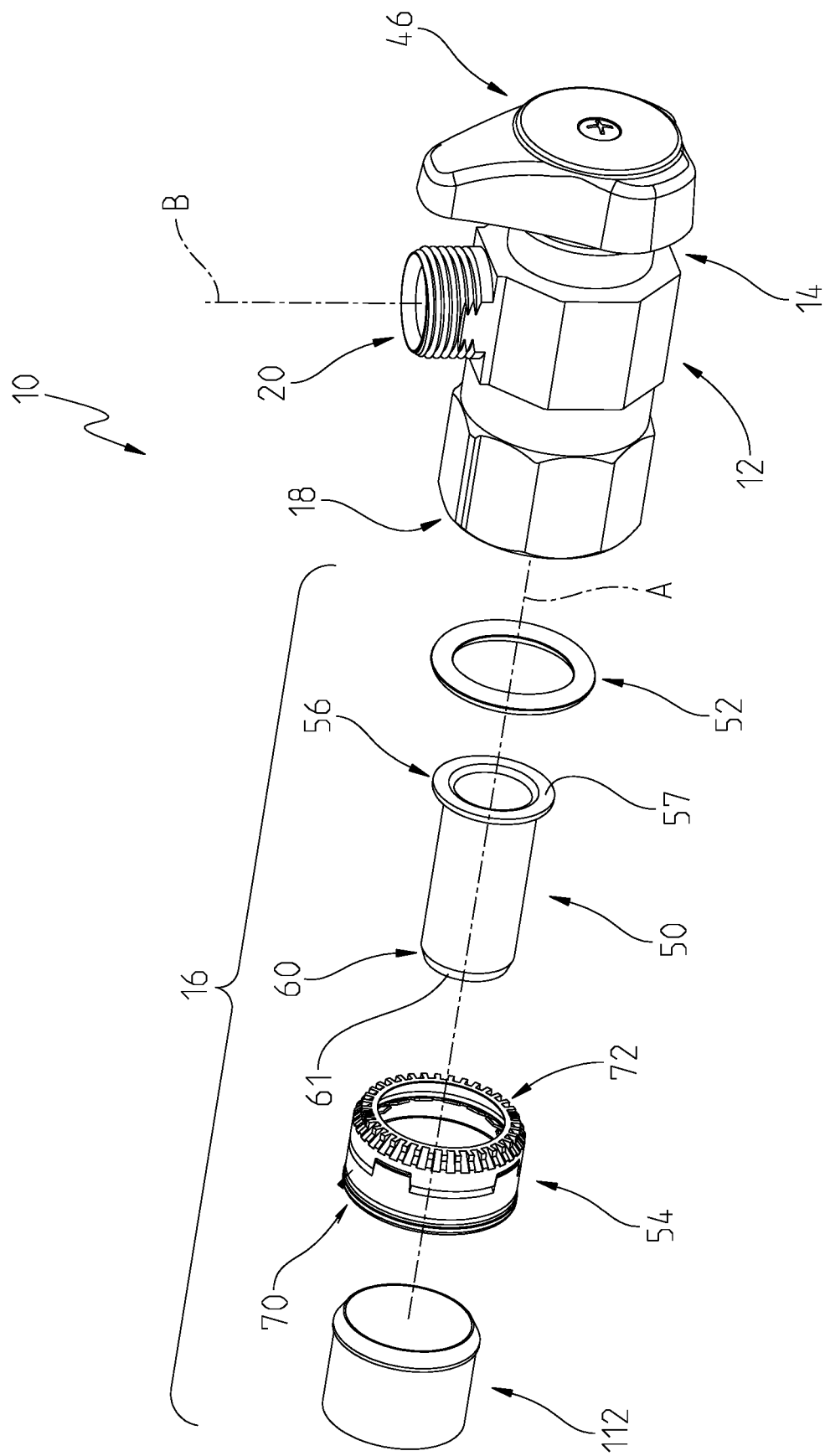
FIG. 3 is a partially exploded perspective view of the illustrative valve assembly of FIG. 1, including the illustrative conduit coupling cartridge.
Figure 4:
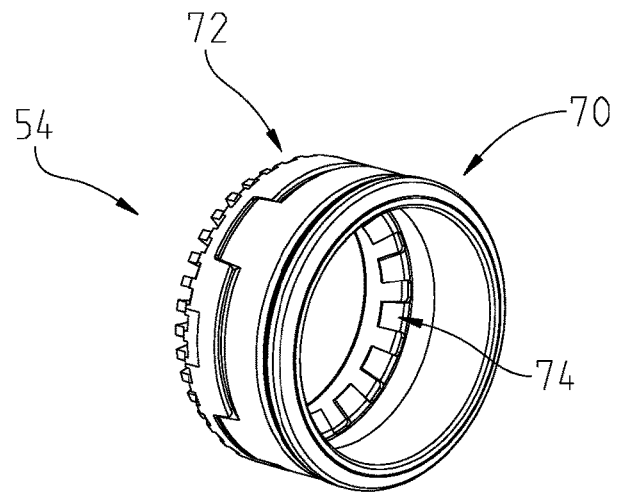
FIG. 4 is a rear perspective view of the illustrative conduit coupling cartridge of FIG. 1.

Still referring to FIG. 2, and additionally referring to FIG. 3, as mentioned above, the supply passage 24 of the valve body 12 carries the conduit coupling 16, which couples the valve body 12 to a conduit, for instance, a fluid supply line 150. The conduit coupling 16 may include one or more walls of the valve body 12, a center support 50, a sealing ring 52, and a coupling cartridge 54.

The center support 50 may include a downstream end 56, which may have a flange 57 located against an axially facing shoulder 58 of the valve body 12 that may be disposed between the valve channel 22 and the supply passage 24. The flange 57 may be disposed radially inwardly of a minimum internal diameter of the supply passage 24. The center support 50 also may include an axially opposite upstream end 60 that may extend axially out of the valve body 12 and that may have an external chamfer 61 to facilitate assembly of the supply line thereon.

The sealing ring 52 may be an O-ring that may be composed of elastomeric material, or may be any other packing component of any type and of any material suitable for use in a fluid connector. The sealing ring 52 may be located against an internal shoulder 62 of the valve body 12, for instance, in a counterbore of the valve body 12, such that one axial end of the sealing ring 52 is directly axially adjacent to the internal shoulder 62 and an opposite axial end of the sealing ring 52 is directly axially adjacent to the coupling cartridge 54.

Referring again to FIG. 2, the coupling cartridge 54 may be at least partially carried in the supply passage 24 of the valve body 12. In an illustrative embodiment, the coupling cartridge 54 is entirely carried in a cartridge counterbore of the supply passage 24. In fact, the coupling cartridge 54 may be axially trapped in the supply passage 24, for instance, between an internal shoulder 64 of the valve body 12 and a crimped end 66 of the valve body 12 at the inlet end 18 thereof. Moreover, the coupling cartridge 54 may have a maximum outer wall 68 at an upstream end of the cartridge 54 that is interference fit against the interior wall 25 of the supply passage 24 of the valve body 12. The interference fit of the coupling cartridge 54 to the valve body 12 may prevent or otherwise resist the cartridge 54 from rotating within the valve body 12 and, in any event, provides a torsional friction resistance that is greater than a torque required to rotate the handle 46.

Now referring to FIGS. 4-7, the illustrative coupling cartridge 54 includes a retainer ring 70 which defines the maximum outer wall 68 of the coupling cartridge 54. The illustrative coupling cartridge 54 further includes a backer ring 72 that may be configured to be rotationally-resistantly coupled to the valve body 12 (FIG. 1) and that is configured to be coupled to the retainer ring 70. The cartridge 54 also includes a gripper ring 74 that is configured to be axially trapped between the retainer ring 70 and the backer ring 72; the gripper ring 74 is configured to engage the supply line 150 (FIGS. 1-2) as further described below.

The retainer ring 70 may be a multi-piece coupling, which may include a first coupler or band 76 which defines the maximum outer wall 68, and a second coupler or band 78 coupled to the first coupler 76. The couplers 76, 78 may be interlocked to one another in any suitable manner. For example, the second coupler 78 may be comprised of a polymer such as plastic, for instance, reinforced polyamide, or other engineering thermoplastic polymers, and may be overmolded to the first coupler 76, which may be comprised of metal, for instance, brass, stainless steel, or any other metal suitable for use in a fluid coupling. The retainer ring 70 may be manufactured by any suitable method. For example, the second coupler 78 may be over-molded (or insert-molded) to the first coupler 76. Alternatively, the second coupler 78 may first be molded and then the first coupler 76 may be assembled and/or adhered to the second coupler 78 in a subsequent manufacturing step.

Still referring to FIGS. 4-7, the gripper ring 74 illustratively includes a base wall 88, and flexible internal tabs, or gripping teeth 90, that may be arranged in a circumferential array to extend radially and axially inwardly from the base wall 88. The illustrative gripper ring 74 also includes one or more locking tabs, or lock tabs 92, preferably in a circumferential array and extending radially outwardly from the base wall 88 for cooperation with the backer ring 72 for preventing relative rotation between the gripper ring 74 and the backer ring 72. The gripper ring 74 may be composed of metal, for instance, stainless steel, or any other metal suitable for use in a fluid coupling.

Figure 5:
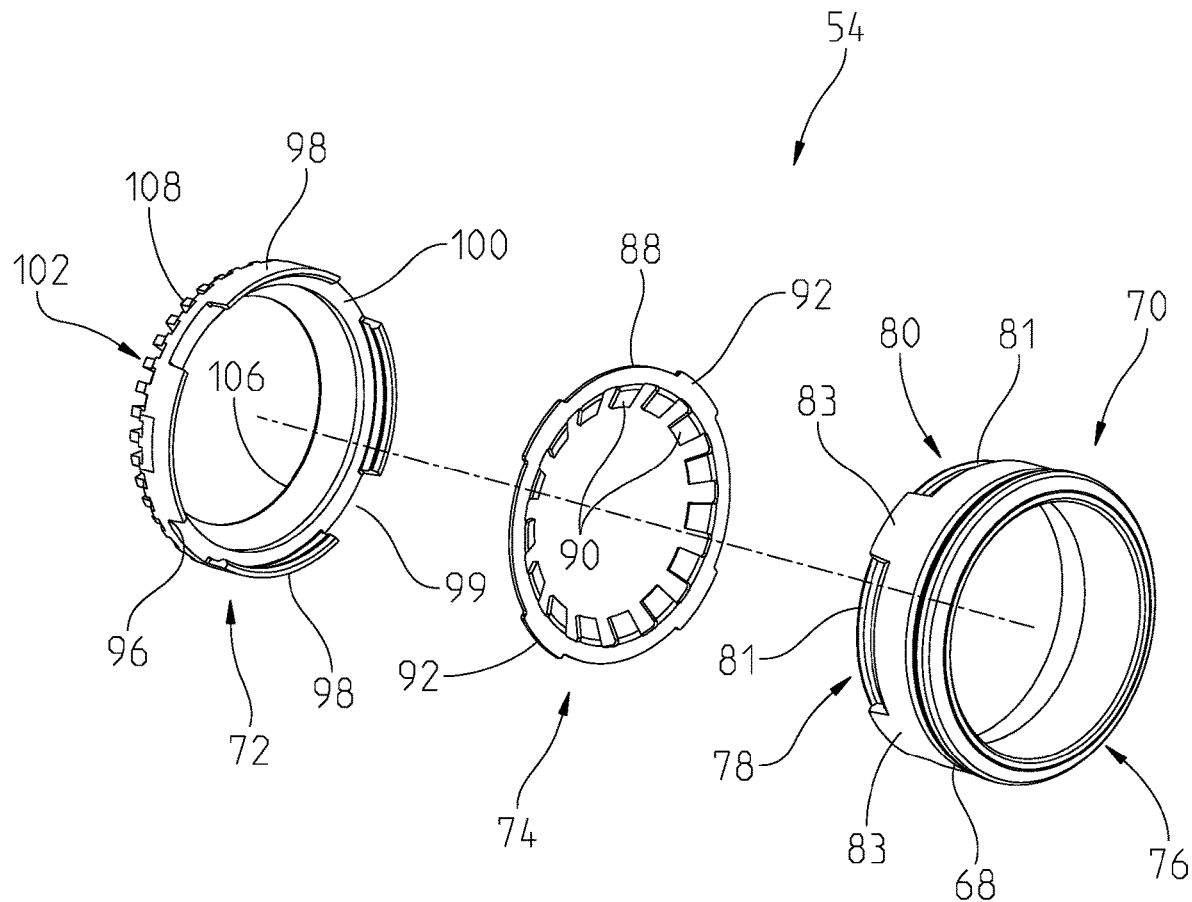
FIG. 5 is a rear exploded perspective view of the illustrative conduit coupling cartridge of FIG. 4.
Figure 6:
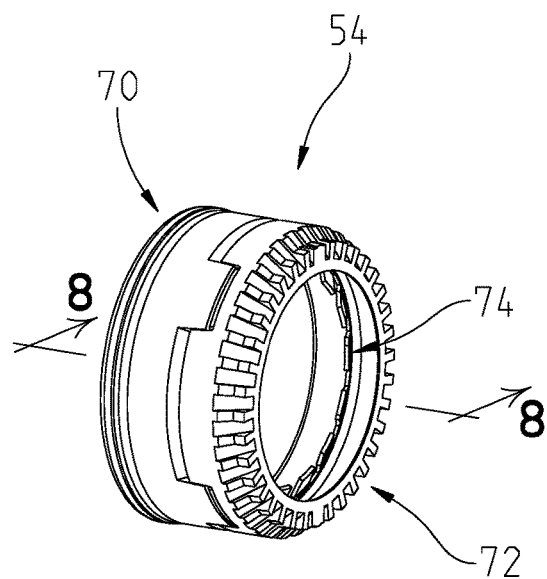
FIG. 6 is a front perspective view of the illustrative conduit coupling cartridge of FIG. 1.
Figure 7:
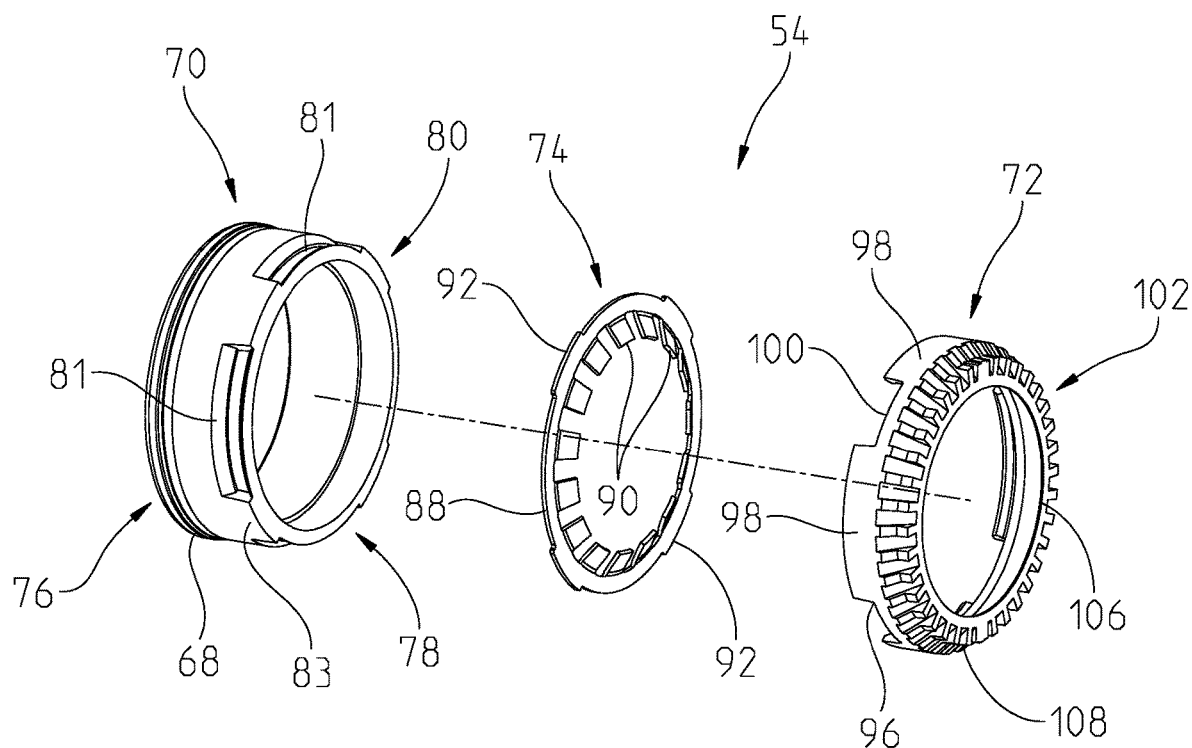
FIG. 7 is a front exploded perspective view of the illustrative conduit coupling cartridge of FIG. 6.
Figure 8:
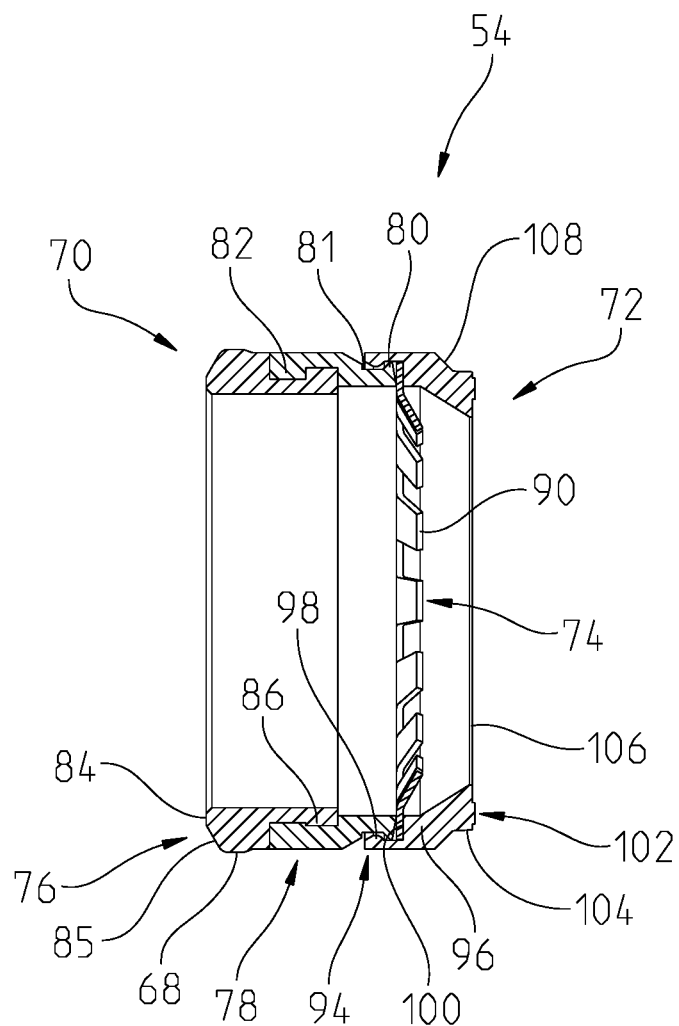
FIG. 8 is a cross-sectional view of the illustrative conduit cartridge of FIG. 6, taken along line 8-8 of FIG. 6.

Now referring to FIGS. 2, 5 and 8, the second coupler 78 of the retainer ring 70 has a downstream or backer coupling end 80, which includes a plurality of circumferentially spaced grooves 81 configured to facilitate the coupling of retainer ring 70 to the backer ring 72, through snap-fit cooperation, for example. The distance between each of grooves 81 defines a first or retention notch wall 83. The second coupler 78 also illustratively has an upstream end 82, which may be configured to axially overlap and interlock in engagement with the first coupler 76. The first coupler 76 has an upstream end 84, which may have a chamfered surface 85 corresponding with the valve body crimped end 66 (FIG. 2) for a close fit when assembled. The first coupler 76 also has a downstream end 86, which may be configured to interlock in engagement with the upstream end 82 of the second coupler 78.

When the backer ring 72 is coupled to the retainer ring 70, the gripper ring 74 may be positioned therebetween, held in place through compression on the one or more lock tabs 92, the compression generated by the coupling between the retainer ring 70 and the backer ring 72. The backer ring 72 may be composed of a polymer, such as plastic, for instance, polyamide, polypropylene, or any other material suitable for use in a fluid coupling. The backer ring 72 has an upstream end 94, which may be configured to axially overlap in engagement with the downstream end 80 of the second coupler 78 of the retainer ring 70. The upstream end 94 of the backer ring 72 may have an outer diameter that is greater than that of a corresponding portion of the retainer ring 70.

As mentioned above, the backer ring 72 may be interference fit to the retainer ring 70, for instance via a snap-fit configuration. For example, the backer ring 72 includes a base wall 96, and may include one or more tangs 98 preferably in a circumferential array and extending away from the base wall 96 for snap-fit cooperation with the plurality of grooves 81 positioned on the coupling end 80 of the second coupler 78. In other words, the plurality of grooves 81 are configured to receive corresponding tangs 98. The distance between each of the tangs 98 defines a resist notch 99, wherein the resist notches 99 are sized to receive a lock tab 92 of the gripper ring 74. For example, when the backer ring 72 and the retainer ring 70 are coupled, each lock tab 92 is received between a resist notch 99 and a retention notch wall 83, resulting in anti-rotational registration, or keying, of the lock tabs 92, eliminating or otherwise limiting circumferential displacement or rotation of the gripper ring 74. In other words, the tangs 98 and the grooves 81 define locking notches configured to retain the lock tabs 92 of the gripper ring 74 to prevent rotational movement of the gripper ring 74. The gripper ring 74 may be located between an axial endmost portion of the downstream end 80 of the second coupler 78 and an internal shoulder 100 of the backer ring 72. The backer ring 72 also has a downstream end 102 with an outer diameter 104 configured to be carried in the seal counterbore of the valve body 12 (FIGS. 1-2), an inner diameter 106 configured to contact an outer diameter of the supply line (FIGS. 1-2), and external ribs, fins, or projection 108 to ensure that the backer ring 72 has uniform wall thickness for manufacturability.

With reference again to FIG. 2, the assembly 10 also may include a supply line releaser or removal collet 112, which may be carried by the cartridge 54. The removal collet 112 may be cylindrical and includes an upstream end 114 and a downstream end 116. The downstream end 116 may comprise a bayonet shape with a shoulder 117 to cooperate with the downstream end 80 of the first coupler 76 of the retainer ring 70 and a taper 119 to cooperate with the gripper ring 74.

In assembly, the supply line 150 is inserted into the inlet end 18 of the valve assembly 10 in an insertion direction X, radially positioned between the center support 50 and the removal collet 112. The supply line 150 is pushed against the gripper ring 74 to deflect the gripping teeth 90, which bite the supply line 150 to resist removal. The supply line 150 is then further pushed downstream in the insertion direction X until an end 151 of the supply line 150 bottoms out on the flange 57 of the center support 50. The gripper ring teeth 90 resist withdrawal of the supply line 150, and the gripper ring tabs 92 resist rotation of the gripper ring 74 with respect to the rest of the cartridge 54. Also, the interference fit between the retainer ring 70 and the valve body 12 resists rotation of the coupling cartridge 54 with respect to the valve body 12.

In use, therefore, referring to all FIGS. 1-8, when a user grasps and turns the handle 46, the valve assembly 10 generally, and the valve body 12 specifically, should not rotate such that it should not be necessary for the user to use another hand to grasp the valve body 12. However, a user may use the removal collet 112 to temporarily disengage the gripper ring 74 so as rotate the valve body 12 to properly orient the outlet 20 toward a desired flow direction. For example, a user may actuate the removal collet 112 in the insertion direction X toward the gripper ring 74 so that the taper 119 comes into contact with the gripping teeth 90 of the gripper ring 74, causing the gripping teeth 89 to flex in the insertion direction X so that the gripping teeth 90 loosen around the supply line 150, allowing the user to simultaneously pull the supply line 150 in a direction opposite the insertion direction X to remove the valve assembly 10 from the supply line 150 or vice versa.

As used in this patent application, the terminology "for example," "for instance," "like," "such as," "comprising," "having," "including," and the like, when used with a listing of one or more elements, is open-ended, meaning that the listing does not exclude additional elements. Likewise, when preceding an element, the articles "a," "an," "the," and "said" mean that there are one or more of the elements. Moreover, directional words such as front, rear, top, bottom, upper, lower, radial, circumferential, axial, lateral, longitudinal, vertical, horizontal, transverse, and/or the like are employed by way of example and not limitation. As used herein, the term "may" is an expedient merely to indicate optionality, for instance, of an element, feature, or other thing, and cannot be reasonably construed as rendering indefinite any disclosure herein. Other terms are to be interpreted and construed in the broadest reasonable manner in accordance with their ordinary and customary meaning in the art, unless the terms are used in a context that requires a different interpretation.

Finally, the present disclosure is not a definitive presentation of an invention claimed in this patent application but is merely a presentation of examples of illustrative embodiments of the claimed invention. More specifically, the present disclosure sets forth one or more examples that are not limitations on the scope of the claimed invention or on terminology used in the accompanying claims, except where terminology is expressly defined herein. And although the present disclosure sets forth a limited number of examples, many other examples may exist now or are yet to be discovered and, thus, it is neither intended nor possible to disclose all possible manifestations of the claimed invention. In fact, various equivalents will become apparent to artisans of ordinary skill in view of the present disclosure and will fall within the spirit and broad scope of the accompanying claims. Features of various implementing embodiments may be combined to form further embodiments of the invention. Therefore, the claimed invention is not limited to the particular examples of illustrative embodiments disclosed herein but, instead, is defined by the accompanying claims.

The invention claimed is:

1. A valve assembly comprising:
a valve body defining a supply passage, the supply passage having an interior wall;
a valve member disposed within the valve body and configured to control fluid flow through the valve body;
a valve handle operably coupled with the valve member whereby rotation of the valve handle about an axis of the supply passage moves the valve member;
a coupling cartridge positioned at least partially within the supply passage of the valve body, the coupling cartridge including:
a retainer ring having a circumferential band defining a maximum diameter outer wall of the retainer ring wherein the maximum diameter outer wall directly contacts the interior wall of the supply passage with an interference fit wherein torsional frictional resistance to relative rotational movement between the retainer ring and the valve body about the axis is greater than torsional resistance to the rotation of the valve handle;
a gripper ring defining an opening, the gripper ring including a base wall and a plurality of internal tabs extending from the base wall into the opening of the gripper ring;
a backer ring coupled to the retainer ring;
wherein the gripper ring is positioned between the retainer ring and the backer ring;
a center support positioned radially inwardly of the coupling cartridge and adapted to be inserted into the supply line wherein the center support extends through the opening of the gripper ring whereby the valve assembly is adapted to grip the supply line between the center support and the internal tabs of the gripper ring; and
wherein the retainer ring comprises a first coupler and a second coupler, the first coupler and the second coupler being coupled together by overmolding, the first coupler forming the circumferential band defining the maximum diameter outer wall of the retainer ring, and wherein the backer ring is engageably secured to the second coupler to thereby secure the gripper ring between the backer ring and the retainer ring.

2. The valve assembly of claim 1, wherein the first coupler comprises metal.

3. The valve assembly of claim 1, wherein the second coupler comprises polymer.

4. The valve assembly of claim 1, wherein the valve body comprises an internal shoulder and a crimped inlet end, wherein the coupling cartridge is axially positioned between the internal shoulder and the crimped inlet end.

5. The valve assembly of claim 4, further comprising a seal disposed between the backer ring and the internal shoulder of the valve body.

6. The valve assembly of claim 1, further comprising a sealing ring wherein the sealing ring is adapted to have the supply line inserted therethrough, wherein the center support extends through the sealing ring, and wherein one end of the center support has radially outwardly extending flange engaged with an axially facing shoulder of the valve body and an opposite end of the center support extends axially outward of the valve body.

7. The valve assembly of claim 1, wherein the retainer ring comprises at least one groove on the outer wall and the backer ring comprises at least one tang configured to snap-fit with the at least one notch of the retainer ring.

8. A valve assembly comprising:
a valve body defining a supply passage, the supply passage having an interior wall; and
a coupling cartridge positioned at least partially within the supply passage of the valve body, the coupling cartridge including:
a retainer ring having an outer wall, wherein the outer wall of the retainer ring directly contacts the interior wall of the supply passage;
a gripper ring defining an opening, the gripper ring including a base wall and a plurality of internal tabs extending from the base wall into the opening of the gripper ring; and:
a backer ring coupled to the retainer ring;
wherein the gripper ring is positioned between the retainer ring and the backer ring; and
wherein the backer ring has a first end portion engaged with the retainer ring, the first end portion defining a first outer diameter, the backer ring having a second end portion opposite the first end portion with the second end portion disposed in a counterbore of the valve body, the second end portion defining a second outer diameter smaller than the first outer diameter, wherein the backer ring has a circumferential array of external projections disposed on the second end portion, and wherein the backer ring defines a uniform wall thickness.

9. A fluid conduit coupling cartridge comprising:
a retainer ring having an outer wall and a plurality of grooves, and a plurality of notch walls defined between adjacent ones of the plurality of grooves;
a gripper ring defining an opening, the gripper ring comprising:
a ring-shaped base wall, the base wall defining a circular radially inner perimeter and a circular radially outer perimeter and a solid ring of material between the circular radially inner perimeter and the circular radially outer perimeter,
a plurality of internal tabs extending radially inwardly from the circular inner perimeter of the base wall into the opening of the gripper ring, and
a plurality of lock tabs extending radially outwardly from the circular outer perimeter of the base wall wherein a radially outermost perimeter of the gripper ring is defined by the plurality of lock tabs and sections of the circular radially outer perimeter of the base wall circumferentially disposed between the plurality of lock tabs; and
a backer ring having a base wall and a plurality of tangs extending away from the base wall, and a plurality of resist notches defined between adjacent ones of the tangs;
wherein the plurality of tangs of the backer ring are configured to couple to the plurality of grooves of the retainer ring; and
wherein the gripper ring is positioned between the retainer ring and the backer ring so that the plurality of lock tabs are each aligned with the plurality of notch walls and the plurality of lock tabs and the plurality of notch walls are positioned in the plurality of resist notches with the plurality of lock tabs being disposed between the plurality of notch walls and the backer ring and wherein the tangs are positioned radially outwardly of the circular radially outer perimeter of the base wall of the gripper ring.

10. A fluid conduit coupling cartridge comprising:
a retainer ring having an outer wall and a plurality of grooves, and at least one notch wall defined between adjacent ones of the plurality of grooves and wherein the retainer ring includes a metal coupler and a plastic coupler overmolded to the metal coupler;
a gripper ring defining an opening, the gripper ring comprising:
a base wall,
a plurality of internal tabs extending from the base wall into the opening of the gripper ring, and
at least one lock tab extending outwardly from the base wall; and
a backer ring having a base wall and a plurality of tangs extending away from the base wall, and at least one resist notch defined between adjacent ones of the tangs;
wherein the plurality of tangs of the backer ring are configured to couple to the plurality of grooves of the retainer ring; and
wherein the gripper ring is positioned between the retainer ring and the backer ring so that the at least one lock tab is positioned in the at least one resist notch between the at least one notch wall and the backer ring.

11. A fluid conduit coupling cartridge comprising:
a retainer ring having an outer wall and a plurality of grooves, and at least one notch wall defined between adjacent ones of the plurality of grooves;
a gripper ring defining an opening, the gripper ring comprising:
a base wall,
a plurality of internal tabs extending from the base wall into the opening of the gripper ring, and
at least one lock tab extending outwardly from the base wall; and
a backer ring having a base wall and a plurality of tangs extending away from the base wall, and at least one resist notch defined between adjacent ones of the tangs;
wherein the plurality of tangs of the backer ring are configured to couple to the plurality of grooves of the retainer ring;

wherein the gripper ring is positioned between the retainer ring and the backer ring so that the at least one lock tab is positioned in the at least one resist notch between the at least one notch wall and the backer ring; and wherein the at least one notch wall, the at least one resist notch, and the at least one lock tab are substantially the same width.

12. A valve assembly comprising:
a valve body including a supply passage; and
a coupling cartridge at least partially carried in the supply passage of the valve body, and including:
  a retainer ring including a maximum diameter that is interference fit to the supply passage of the valve body wherein the retainer ring is an overmolded two-piece component;
  a gripper ring including:
    a base wall,
    gripping teeth, and
    one or more locking tabs extending radially outwardly from the base wall; and
  a backer ring that is interference fit to the retainer ring to trap the gripper ring between the retainer ring and the backer ring.

13. The valve assembly of claim 12, wherein the backer ring includes:
a base wall, and
one or more tangs extending away from the base wall for coupling to the retainer ring and establishing locking notches for anti-rotational registration of the locking tabs of the gripper ring.

14. The valve assembly of claim 13, wherein the retainer ring includes a metal coupler establishing the maximum outer diameter of the retainer ring that is interference fit to the supply passage of the valve body.

15. The valve assembly of claim 14, wherein the retainer ring also includes a plastic coupler overmolded to the metal coupler, the plastic coupler having an interlocking end for snap-fit cooperation with the backer ring.

16. The valve assembly of claim 15, wherein the tangs of the backer ring are for snap-fit cooperation with the interlocking end of the plastic coupler.

17. The valve assembly of claim 12, wherein the valve body includes an internal shoulder and a crimped inlet end, wherein the coupling cartridge is axially trapped between the internal shoulder and the crimped inlet end.

18. The valve assembly of claim 12, wherein the backer ring includes a circumferential array of external projections.

19. The valve assembly of claim 12, further comprising a seal disposed between the backer ring and an internal shoulder of the valve body.

20. The valve assembly of claim 12, further comprising a center support carried radially inwardly of the coupling cartridge.

21. A fluid conduit coupling cartridge comprising:
a retainer ring, the retainer ring being an overmolded two-piece component;
a gripper ring including:
  a first base wall,
  gripping teeth, and
  one or more locking tabs extending radially outwardly from the first base wall; and
a backer ring that is interference fit to the retainer ring to trap the gripper ring between the retainer ring and the backer ring, and including:
  a second base wall, and
  one or more tangs extending away from the second base wall for coupling to the retainer ring and establishing locking notches for anti-rotational registration of the locking tabs of the gripper ring.

22. The fluid conduit coupling cartridge of claim 21, wherein the retainer ring includes a metal coupler and a plastic coupler overmolded to the metal coupler.

23. The fluid conduit coupling cartridge of claim 21, wherein the retainer ring includes an interlocking end for snap-fit cooperation with the backer ring.

24. The fluid conduit coupling cartridge of claim 23, wherein the tangs of the backer ring are for snap-fit cooperation with the interlocking end.

* * * * *